United States Patent [19]

Maurer

[11] Patent Number: 5,624,557
[45] Date of Patent: Apr. 29, 1997

[54] PRESSURE FILTER

[75] Inventor: Uwe Maurer, Schweim, Germany

[73] Assignee: Mike Maurer, Schwelm, Germany

[21] Appl. No.: 392,769

[22] PCT Filed: Jun. 21, 1994

[86] PCT No.: PCT/DE94/00709

§ 371 Date: Apr. 12, 1995

§ 102(e) Date: Apr. 12, 1995

[87] PCT Pub. No.: WO95/00228

PCT Pub. Date: Jan. 5, 1995

[30]     Foreign Application Priority Data

Jun. 24, 1993 [DE] Germany ............... 43 20 954.81

[51] Int. Cl.$^6$ ............... B01D 29/68; B01D 29/43
[52] U.S. Cl. ............... 210/411; 210/413; 210/415; 210/461; 210/347; 210/333.01
[58] Field of Search ............... 210/411, 413, 210/415, 396, 414, 333.01, 333.1, 461, 347

[56]     References Cited

U.S. PATENT DOCUMENTS 3,640,395  2/1972  Kinney.
4,085,051  4/1978  Kaminsky.
4,162,219  7/1979  Miropolsky.

FOREIGN PATENT DOCUMENTS 2737135   3/1979  Germany.
3734245   4/1989  Germany.
210092    2/1968  U.S.S.R..
1243768   7/1986  U.S.S.R..

Primary Examiner—Thomas M. Lithgow
Attorney, Agent, or Firm—Herbert Dubno

[57]         ABSTRACT

A pressure filter has a fluid compartment with a fluid inlet and at least one filter surface in the fluid compartment having a plurality of apertures, one side of the filter surface bounding the fluid compartment and the other side thereof bounding a filtrate compartment having a filtrate outlet. The backwashing system includes a backwashing head sweeping over the filter surface and sealing a part thereof with respect to the fluid compartment. The backwashing head restricts a backwashing compartment having at least one suction chamber open in a slot-like manner to the filter surface and having connected thereto a reject drain. The filter includes two filter surfaces located in the front side range of a hub. The hollow shaft is rotatably supported within the hub. The hollow shaft is coupled at its front sides to a respective backwashing head and at its cylindrical part to a drive means located outside of the fluid compartment. The interior of the hollow shaft is connected to the backwashing compartments heads at its front sides and to the reject drain in the cylindrical part of the hollow shaft. It is not necessary that the filter have its own pressure housing. It can be rather installed into any container if it is provided with a suitable carrier tube.

10 Claims, 2 Drawing Sheets

PRESSURE FILTER

CROSS-REFERENCE TO RELATED APPLICATIONS

This application is a national phase of PCT/DE 94/00709 filed Jun. 21, 1994 and based, in turn, upon German National application P43 20 954.8 filed Jun. 24, 1993 under the International Convention.

FIELD OF THE INVENTION

The present invention is directed to a pressure filter comprising a fluid compartment with a fluid inlet, at least one filter surface within the fluid compartment having a plurality of apertures, one side of the filter surface being restricted by the fluid compartment and the other side thereof being restricted by a filtrate compartment having a filtrate outlet. The invention is, more particularly, related to a pressure filter of this type having backwashing means with a slat-like or plate-like backwashing head sweeping over the filter surface and sealing a part of the filter surface with respect to the fluid compartment, the backwashing head having a backwashing compartment restricting at least one suction chamber open in a slot-like manner to the filter surface, the backwashing compartment having a reject drain connected thereto.

BACKGROUND OF THE INVENTION

Such a pressure filter is known from EP 0 479 077 A1. This pressure filter works with a continuous cleaning of the filter surface and is especially intended for the separation of solids from suspensions. The pressure filter comprises a plurality of pressure-tight filter elements separating the fluid compartment from the filtrate compartment and forming the filter surface while the backwashing means is connected to the reject drain and has a backwashing head sealing a part of the filter surface with respect to the fluid compartment. The backwashing head and the filter surface are movable with respect to one another. The fluid to be filtered is supplied to the pressure filter with a pressure $p_1$ and acts on the filter elements with this pressure $p_1$ in the fluid compartment. The filtrate is drained from the filtrate compartement with a lower pressure $p_2$. In the reject drain and backwashing compartment, restricted by the backwashing head, a pressure $p_3$ is adjustable which is always smaller than the pressure $p_2$ in the filtrate compartment. A filtration occurs because of the pressure difference between the pressure $p_1$ of the fluid compartment and the pressure $p_2$ of the filtrate compartment, wherein solids are deposited on the filter surface and form a cover layer. This cover layer is continuously cleaned by backwashing, i.e. a conversion of the flow direction through the filter elements. The backwashing occurs at that portion of the filter surface which is sealed by the backwashing head with respect to the fluid compartment with a pressure difference between the pressure $p_2$ in the filtrate compartment and the pressure $p_3$ in the backwashing compartment. The filtration process at the remaining filter surface of the pressure filter is not influenced by the backwashing.

In the known pressure filter the backwashing compartment has at least one suction chamber open to the filter surface in a slot-like manner. This suction chamber is formed as elongated chamber extending from a central drive shaft for the backwashing head radially outwardly. Upon rotation of the backwashing head the slot-like aperture sweeps over the filter surface as a radial beam emanating from the center of the pressure filter.

In detail, the known pressure filter has a plurality of filter-carrying filter plates which are stationary in a pressure container. The backwashing heads disposed on a hollow shaft extending through a pressure container engage into fluid spaces between the filter plates. The hollow shaft extends laterally outwardly from the pressure container and is connected there to a suitable drive means. The individual backwashing heads are driven by rotation of the hollow shaft. Furthermore, the hollow shaft serves for draining the reject evacuated by means of the backwashing heads. All the backwashing heads are secured to the cylindrical portion of the hollow shaft.

OBJECT OF THE INVENTION

The object of the invention is to provide an improved pressure filter of the type described which is characterized by a compact design, a good aptitude for maintenance, a high flow rate and a good efficiency.

SUMMARY OF THE INVENTION

According to the invention this object is achieved in that the pressure filter includes two filter surfaces disposed in the front region of a hub and a hollow shaft is rotatably supported within the hub, the hollow shaft being coupled at ends to backwashing heads and at its cylindrical portion to a drive means disposed outside of the fluid compartment and the interior thereof being connected to the backwashing compartments of the backwashing heads at the front sides and to a reject drain in the cylindrical portion of the hollow shaft.

Accordingly, with the invention, the filter surfaces with the associated backwashing heads are diposed in the two front side regions of the hub, and the drive for the hollow shaft as well as the connection of the hollow shaft to the reject drain are realized at the cylindrical portion of the shaft. Thus, according to this arrangement space for a respective filter surface with associated backwashing head remains at the front sides of the hub or hollow shaft, the filter surfaces being not interrupted by the hollow shaft extending to the outside of the pressure filter housing. Accordingly, very large filter surfaces can be formed, and sufficient space for an especially efficient design of the backwashing heads is present so that high flow rates with a good filter efficiency can be obtained with a design which is compact per se. Moreover, such an filter can be easily maintained.

A closed filtrate compartment is formed between the two filter surfaces which are provided at the front sides or the ends of the hollow shaft. This filtrate compartment is radially restricted by a jacket connecting the two filter surfaces with one another. The drive connection through the hollow shaft and the reject drain extends through this jacket. Furthermore, a filtrate outlet line extends from the same. Further support rings or ribs can be provided between the two filter surfaces which are carried by corresponding filter elements for reinforcing purposes. These support rings or ribs are provided with corresponding apertures for the passage of filtrate.

The invention does not exclude that, in addition to the two filter surfaces which are disposed at the end sides, further filter surfaces are disposed between the same so that the filtrate compartment is correspondingly divided. However, it is always essential for the invention that filter surfaces are disposed at both end sides or front sides of the hub and that backwashing heads are disposed at both end sides or front sides of the hollow shaft, the backwashing heads lying axially outside of the filter surfaces. Finally, the hollow shaft is not to extend out of the pressure filter housing, but a special drive member extending perpendicular to the hollow shaft is provided for the drive thereof.

Preferably, also the outlet line for the filtrate is provided at the jacket of the filter portion surrounding the filtrate chamber and not at the two front sides or end walls of this filter portion. Accordingly, preferably all the inlet and outlet lines and drive members extend radially into the pressure filter with regard to the hub and the hollow shaft so that the two end sides of the filter portion surrounding the filtrate chamber are completely used for the arrangement of the backwashing heads. Preferably, all the inlet lines and outlet lines and drive members are disposed within a common protection tube which, as described in subsequently, can be also formed as carrier tube for the part of the filter surrounding the filtrate chamber. In this embodiment the pressure filter need not have its own housing but can be supported by means of the mentioned carrier tube at a suitable place, for example outside of a container into which the pressure filter is introduced.

As already mentioned, the reject is passed from the two backwashing compartments of the two backwashing heads to the interior of the hollow shaft to a reject drain and from this out of the pressure filter. Preferably, the hub includes a hollow space surrounding the hollow shaft and having connected thereto the reject drain and being connected to the interior of the hollow shaft by means of at least one aperture within the wall of the hollow shaft. Accordingly, the hollow shaft rotating during the backwashing process discharges the reject to the hollow space within the hollow shaft and from there into the reject drain by means of the at least one aperture in the wall of the hollow shaft. Also a line serving for the ventilation of the hollow shaft can be connected to this hollow space, which line opens radially into the hub either.

As mentioned, for the realization of the backwashing process the hollow shaft is driven by means of a drive member extending perpendicularly with respect to the hollow shaft and extending radially out of the pressure filter and connected to suitable drive means, for example an electric motor with prearranged transmission. The drive member extends radially through the filtrate chamber and is surrounded by a protection tube. So, preferably a drive shaft disposed in a protection tube extends from the drive means into a hollow space of the hub and is coupled there with the hollow shaft. For the coupling the drive shaft and the hollow shaft each have a cup gear or bevel gear which mesh with one another.

Conveniently, the connection between the hollow shaft and the backwashing heads arranged at the front sides thereof is realized by means of hollow connection pieces connected to the backwashing heads and the hollow shaft in a fixed manner with regard to rotation. These connection pieces guarantee on the one side the mounting of the backwashing heads at the hollow shaft and include on the other side a throughhole for the reject to be introduced into the hollow shaft. Preferably, the hollow connection pieces have a tube portion merging into an annular flange which is mounted at a corresponding part of the backwashing head, for example the carrier plate thereof.

Normally, the pressure filter according to the invention can have a housing surrounding the part of the filter surrounding the filtrate chamber and restricting a corresponding fluid compartment into which the inlet for the mixture to be filtered opens. The part of the filter surrounding the filtrate chamber, i.e. the interior thereof, is preferably mounted at the filter housing by means of ribs. Accordingly, with this embodiment the tubes or lines extending out of the filter housing do not have any carrier function for the inner part of the filter.

According to another embodiment which has been already mentioned above the filter part surrounding the filtrate compartment is mounted at a support means by means of a carrier tube. In this case, the carrier tube is fixed at the jacket of the filter part surrounding the filtrate compartment and receives all the drive members or lines so that the same extend through the fluid compartment and possibly through the filtrate compartment to the hub or hollow shaft within the carrier tube. Accordingly, such a carrier tube serves simultaneously for leading out the drive members and lines and as carrier member for the inner part of the filter.

For example, the outer end of the carrier tube can be mounted at a manhole cover. This manhole cover serves for closing the manhole of a container into which the inner part of the pressure filter is introduced. Accordingly, with this embodiment no special housing for the pressure filter is provided or is necessary. In contrast of this the pressure filter can be introduced into each sufficiently large pressure container in order to filter the fluid present in this container. The mounting of the pressure filter is realized by means of the carrier tube which is secured at the corresponding manhole cover of the container.

Accordingly, with a special embodiment of the invention the drive shaft, the reject drain, corresponding ventilation lines for the filtrate compartment and the hollow shaft as well as a filtrate outlet line for the filtrate compartment extend through the carrier tube.

Furthermore, the carrier tube can extend through the filtrate compartment to the hub. However, according to another embodiment it stops at the jacket of the filter part surrounding the filtrate compartment, and the individual drive members and lines extend individually to the hub without carrier tube, wherein the drive shaft is surrounded by a smaller protection tube.

BRIEF DESCRIPTION OF THE DRAWING

The above and other objects, features, and advantages will become more readily apparent from the following description, reference being made to the accompanying drawing in which.

Figure 2:
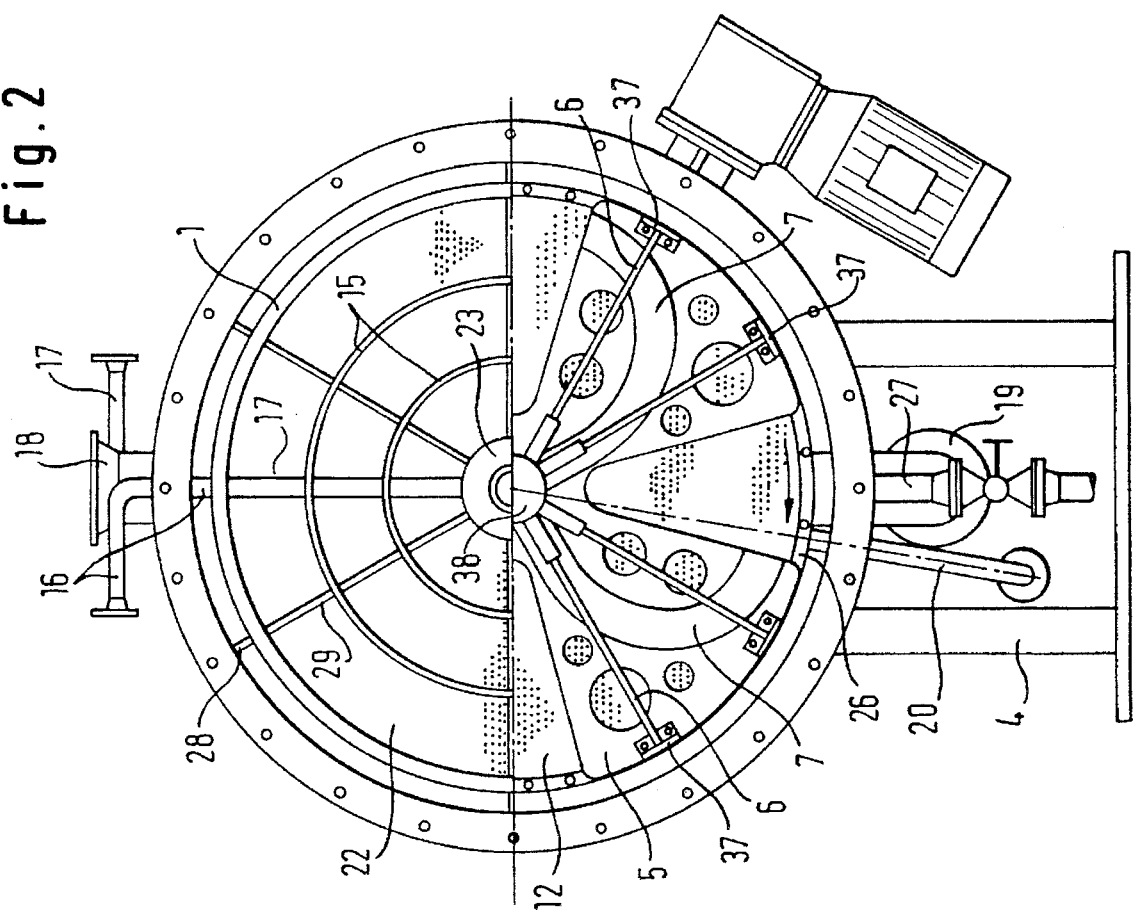
FIG. 2 is an elevational view partly broken away of the pressure filter of FIG. 1 with removed housing wall and partly removed backwashing head and filter element.
Figure 1:
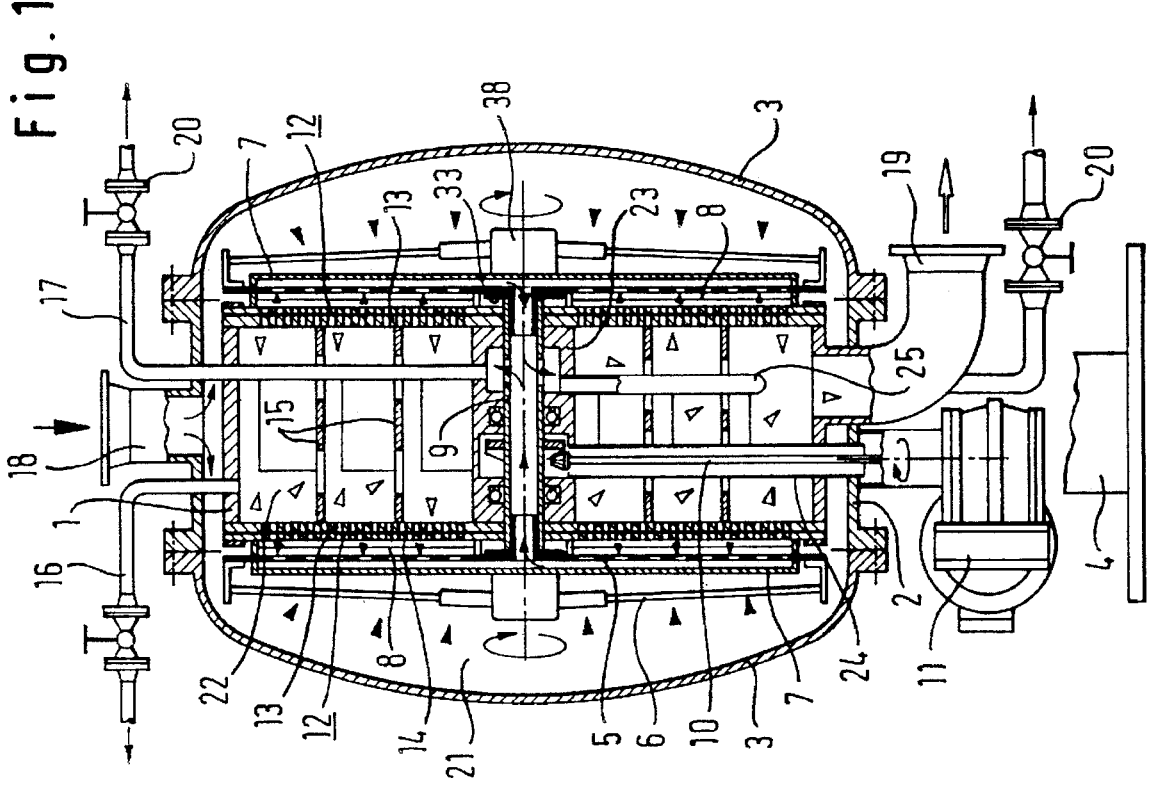
FIG. 1 shows a radial section through a first embodiment of a pressure filter according to the invention.

The pressure filter shown in FIGS. 1 and 2 has a carrier ring 1, at the inner side of which support rings 15 and ribs 29 are connected such that a hub 23 is centrally held. At its both open sides the carrier ring 1 is closed by a respective circular filter element 12 which is comprised of a first and a second perforated plate 13 between which a suitable filter fleece of textile material is located. These filter elements form a respectively filter surface. The annular assembly consisting of a carrier ring 1 and the two filter elements 12 is disposed within a housing 3 forming a fluid chamber which is supplied with the fluid to be filtered by means of an inlet 18. A filtrate chamber having connected thereto a filtrate outlet line 19 is located within the annular assembly consisting of the carrier ring 1 and the filter elements 12.

A hollow shaft 9 open at both ends extends through the hub 23. It extends through slide bearings, ball bearings and seals which prevent that fluid can enter the hollow shaft portion. Connection pieces are mounted into the open ends of the hollow shaft 9 and rotate together with the hollow shaft. A carrier plate 5 is mounted to this flange-like enlarging connection piece in a rotatably fixed manner, respectively.

The interior of the hollow shaft is connected to a venting line 17 and to a reject drain 25. Both lines extend through the filtrate chamber and are provided with shut-off valves (shown at 20) outside of the pressure filter, respectively. A venting line 16 having a suitable shut-off valve extends also from the filtrate chamber towards the outside of the pressure filter.

The annular assembly consisting of the carrier ring 1, the two filter elements 12 and the support rings 15 and ribs 29 and the corresponding lines 16, 17, 19, 25 are stationary within the housing 3.

The pressure filter has two backwashing heads of which each is associated with a filter element 12 and sweeps over the filter surface thereof. The backwashing heads consist of a carrier plate 5 and of a plurality of helically curved backwashing slats 8 which are secured at the carrier plate. The shape of the backwashing slats 8 is shown in FIG. 2. In this figure the drain portion 7 of the backwashing slats located above the carrier plate 5 is shown. The carrier plate 5 includes recesses between the individual backwashing slats so that fluid from the fluid chamber 21 can pass through the filter surfaces into the filtrate chamber. The backwashing slats 8 have suction chambers in their interior and are provided with a helically curved slot-like aperture on their side adjacent to the filter surface by means of which the backwashing process is carried out. The substance formed as cover layer on the filter surface is sucked off by means of the helical slot-like aperture and is passed to the reject drain portion 7 of the backwashing slats through apertures formed in the carrier plate 5, wherefrom the reject is passed radially inwardly into the hollow shaft 9 and from there out of the pressure filter through the reject drain 25.

The backwashing heads are driven through the hollow shaft 9 which is connected to a cup gear on its outer side. The cup gear meshes with a bevel gear of a drive shaft 10 which is disposed in a tube 24 extending through the fluid chamber and the filtrate chamber. The drive shaft 10 is rotated by means of a suitable drive motor 11. The whole pressure filter is disposed on a suitable stand 4.

As FIGS. 1 and 2 further show, each backwashing head is provided with a plurality of spring struts 6 extending from the center of the backwashing head to the radial end portion thereof. The spring struts 6 are biased and extend between brackets 37 which are secured at the edge of each carrier plate 5 and a support block 38 centrally located at the respective carrier plate, wherein the spring struts are clamped between the central support block 38 and the corresponding bracket 37. The spring struts 6 are biased and act on the bracket 37 with a corresponding force so that a momentum is applied to the radial outer edge portion of the corresponding carrier plate 5. This edge portion of the carrier plate is pressed towards the corresponding filter surface by this momentum.

FIG. 2 shows that each bracket of the carrier plate 5 has associated therewith two spring struts extending over the corresponding hollow slats. The spring struts provide for a uniform pressing of the curved hollow slats with the corresponding curved slot-like aperture against the filter surface at every place so that the pressure difference necessary for the backwashing is maintained.

As mentioned above, according to this embodiment the pressure filter has a pressure housing 3 surrounding the interior of the filter and forming a fluid compartment. The mounting of the interior at the pressure housing 3 is realized by means of ribs 28 in continuation of the ribs 29 within the filtrate compartment, as shown in FIG. 2. The two ventilation lines 16, 17 for the filtrate compartment and the hollow shaft extend upwardly in FIG. 1 out of the pressure filter housing 3, while the drive shaft 10 with associated connection tube and the reject drain 25 extend downwardly in FIG. 1 out of the pressure filter housing 3. Also the filtrate outlet line 19 extends downwardly in FIG. 1 out of the filtrate chamber.

Accordingly, it can be recognized that all the lines and drive components extend radially out of the interior of the filter so that the two end surfaces or front surfaces can be completely used as filter surfaces with associated backwashing heads.

Figure 3:
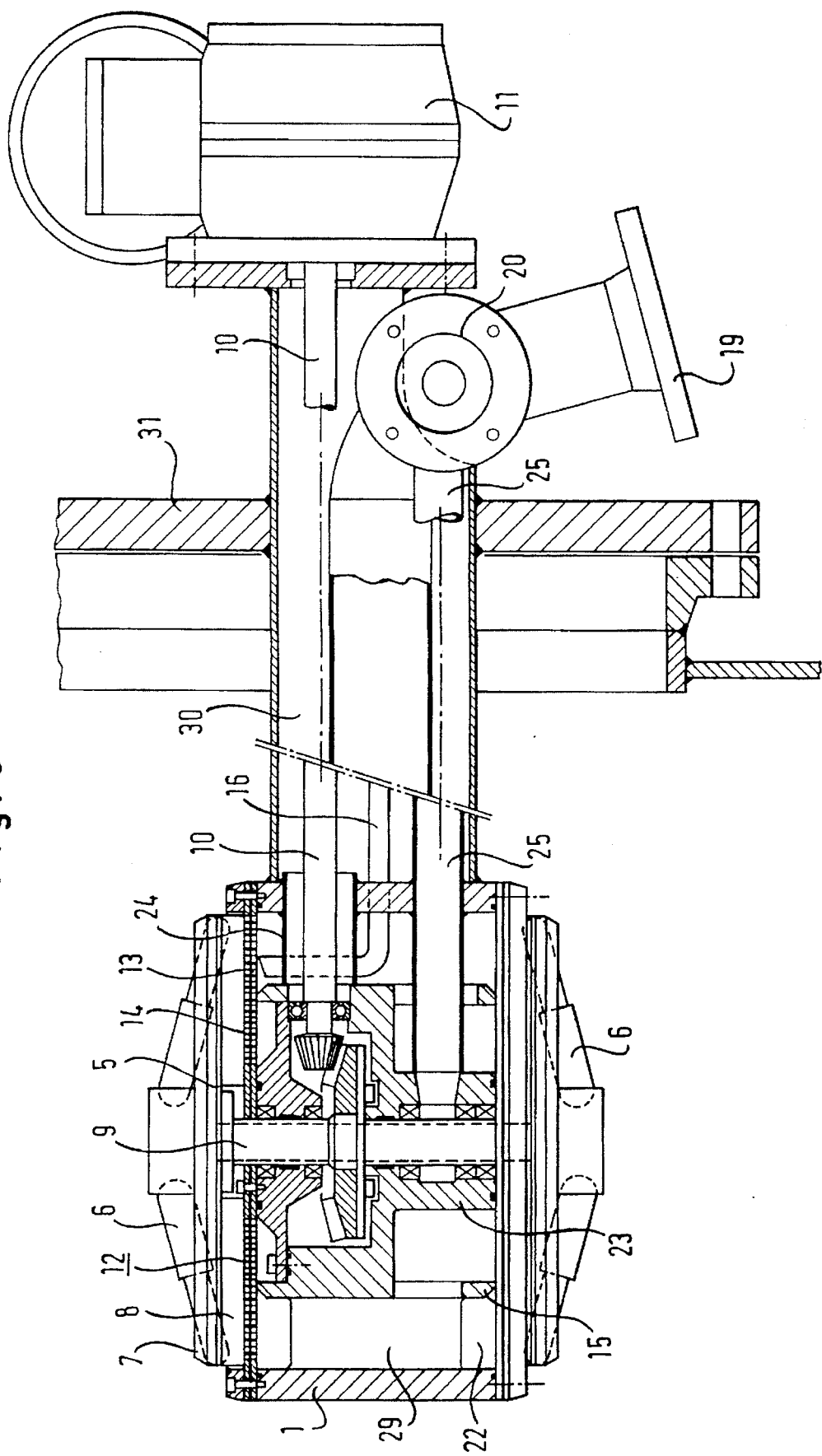
FIG. 3 is a vertical section similar to FIG. 1 through another embodiment of a pressure filter according to the invention.

FIG. 3 shows another embodiment of a pressure filter according to the invention. In its fundamental design this embodiment corresponds to the embodiment of FIGS. 1 and 2. However, in contrast to the embodiment of FIGS. 1 and 2, the filter of FIG. 3 does not have its own pressure filter housing. Furthermore, all the lines leading to the interior of the filter as well as the drive members are located in a common carrier tube 30 which simultaneously serves as protection tube for the lines and drive members. The support of the inner part of the filter is realized by menas of the carrier tube 30 which is welded to the carrier ring 1 of the filter inner part. Accordingly, the filter can be introduced into any pressure container and can fulfil its filter function within the same. For this, the filter is introduced through a manhole in the container by means of the carrier tube 30. A manhole cover 31 of corresponding size is welded to the carrier tube 30 so that the pressure filter can be secured to the corresponding container by means of the manhole cover 31. Accordingly, the pressure filter can be used for containers of any size and any design, wherein only the manhole cover 31 secured at the carrier tube 30 has to be adapted to the corresponding manhole size of the respective container.

The carrier tube 30 extends to the carrier ring 1. According to this embodiment it takes up the drive shafts 10 for the hollow shaft 9 provided with the bevel gear, the reject drain 25, a ventilation line 16 for the filtrate compartment and the filtrate outlet line 19. A ventilation line for the hollow shaft can be also taken up, however, is not shown in this embodiment.

It can be recognized that the carrier tube does not extend through the filtrate chamber. Here, rather the individual lines continue to run separately, wherein the drive shaft is surrounded by a protection tube. According to FIG. 3 the hub 23 expands radially from the left to the right, wherein a hollow space is located in the enlarged portion and receives an enlarged cup gear of the hollow shaft 9 which meshes with the bevel gear at the end of the drive shaft 24. A smaller hollow space is provided in the left part of the hub with smaller diameter, the smaller hollow space serving for discharging the reject from the hollow shaft into the reject drain 25. According to this embodiment the hollow shaft 9 is supported with the hub 23 by means of slide bearings, ball bearings and seals either.

The remaining components of the pressure filter are correspondingly designed as with the embodiment of FIGS. 1 and 2 and are provided with the same reference numbers. A double spur wheel transmission motor is used as drive means 11.

The pressure filter of this embodiment can be directly installed in whatever pressure containers or storage containers in a lateral, standing or suspended manner in connection with a corresponding dimensioning. The filter is characterized by its low space requirement and its high flow rate and its good aptitude of maintenance since no stock is necessary and only small waste disposal problems occur. The filter is dimensioned for pressures up to 20 bar and temperatures up to +120° C. It can be also produced in a manner suited for food. As materials, standard steel and VA-steel are used, which, if necessary, are lined or rubber coated.

I claim:

1. A pressure filter comprising:

a hub;

an annular support coaxially surrounding said hub;

two filter surfaces spanning between said hub and said support at opposite ends of said hub and defining between them an annular filtrate compartment between said hub and said support, said filter surfaces having outer sides delimiting a fluid compartment from which fluid passes through said filter surfaces into said filtrate compartment;

a hollow shaft rotatable in said hub;

respective backwashing heads connected to opposite ends of said hollow shaft and rotatable therewith, each of said backwashing heads having a backwashing compartment having a suction chamber with a slot-like opening turned toward the respective outer side of a respective filter surface, said backwashing heads sweeping over the respective filter surface upon rotation of said shaft and sealing a part of the respective filter surface relative to said fluid compartment;

drive means external of said fluid compartment connected to said hollow shaft at a cylindrical portion thereof for rotating said hollow shaft; and a reject drain communicating with said hollow shaft and with said backwashing compartments through said hollow shaft and extending out of said filtrate compartment, said hub having a hollow space surrounding said hollow shaft and connected to said reject drain, said hollow shaft having an interior communicating with said hollow space through at least one aperture formed in a wall of said hollow shaft.

2. The pressure filter defined in claim 1 further comprising a venting line connected to said hollow space.

3. The pressure filter defined in claim 1 wherein said hollow shaft is coupled to said backwashing heads by means of hollow connection pieces connected to the backwashing heads and to the hollow shaft in a rotatably fixed manner.

4. The pressure filter defined in claim 1 further comprising a housing enclosing said fluid compartment, said support and said hub being connected to said housing by ribs.

5. A pressure filter comprising:

a hub;

an annular support coaxially surrounding said hub;

two filter surfaces spanning between said hub and said support at opposite ends of said hub and defining between them an annular filtrate compartment between said hub and said support said filter surfaces having outer sides delimiting a fluid compartment from which fluid passes through said filter surfaces into said filtrate compartment;

a hollow shaft rotatable in said hub;

respective backwashing heads connected to opposite ends of said hollow shaft and rotatable therewith, each of said backwashing heads having a backwashing compartment having a suction chamber with a slot-like opening turned toward the respective outer side of a respective filter surface, said backwashing heads sweeping over the respective filter surface upon rotation of said shaft and sealing a part of the respective filter surface relative to said fluid compartment;

drive means external of said fluid compartment connected to said hollow shaft at a cylindrical portion thereof for rotating said hollow shaft; and a reject drain communicating with said hollow shaft and with said backwashing compartments through said hollow shaft and extending out of said filtrate compartment, said drive means including a drive shaft located in a protected tube and extending to a hollow space formed in said hub and coupled to said hollow shaft at said hollow space formed in said hub.

6. The pressure filter defined in claim 5 wherein said drive shaft has a bevel gear and said hollow shaft has a further gear meshing with said bevel gear.

7. The pressure filter defined in claim 5 wherein said hollow shaft is coupled to said backwashing heads by means of hollow connection pieces connected to the backwashing heads and to the hollow shaft in a rotatably fixed manner.

8. The pressure filter defined in claim 5 further comprising a housing enclosing said fluid compartment, said support and said hub being connected to said housing by ribs.

9. The pressure filter defined in claim 5 further comprising a carrier tube connected to said support for holding same in said fluid compartment, said drive shaft and said reject drain passing through said carrier tube.

10. The pressure filter defined in claim 9 further comprising a manhole cover connected to said carrier tube.

* * * * *